(12) United States Patent
Bell et al.

(10) Patent No.: US 6,554,094 B1
(45) Date of Patent: Apr. 29, 2003

(54) METHOD AND SYSTEM FOR INDEPENDENTLY ELECTRONICALLY CONTROLLING STEERING OF VEHICLE WHEELS

(75) Inventors: Dale Bell, Ortonville, MI (US); Christos T. Kyrtsos, Southfield, MI (US); Christopher S. Keeney, Troy, MI (US); Frank A. Palmeri, Troy, MI (US); Dean A. Molde, Pinehurst, NC (US); Gerald J. Montgomery, Pinehurst, NC (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/466,297

(22) Filed: Dec. 17, 1999

(51) Int. Cl.[7] .............................. B62D 1/00; B62D 5/04
(52) U.S. Cl. ........................ 180/402; 152/416; 180/403; 180/444
(58) Field of Search ................................ 180/402, 403, 180/411, 428, 432, 433, 435, 438, 422, 423, 444; 152/416, 417

(56) References Cited

U.S. PATENT DOCUMENTS

| | | | | |
|---|---|---|---|---|
| 3,532,178 A | * | 10/1970 | Lindbom | |
| 3,572,458 A | * | 3/1971 | Tax | |
| 4,109,747 A | * | 8/1978 | Hornagold et al. | |
| 4,263,979 A | * | 4/1981 | Sturgill | |
| 4,691,797 A | * | 9/1987 | Miller | |
| 4,741,409 A | * | 5/1988 | Westercamp et al. | |
| 4,742,857 A | * | 5/1988 | Gandhi | |
| 4,823,899 A | * | 4/1989 | Ron | |
| 5,002,142 A | * | 3/1991 | Klosterhaus | |
| 5,141,069 A | * | 8/1992 | Yaui | |
| 5,147,009 A | * | 9/1992 | Chikuma et al. | |
| 5,154,437 A | | 10/1992 | Inagaki et al. | |
| 5,347,458 A | | 9/1994 | Serizawa et al. | |
| 5,862,878 A | | 1/1999 | Bohner et al. | |
| 5,880,367 A | | 3/1999 | Vaughn | |
| 5,884,724 A | * | 3/1999 | Bohner et al. | |
| 6,050,360 A | * | 4/2000 | Pattok et al. | 180/466 |
| 6,148,949 A | * | 11/2000 | Kobayashi et al. | |
| 6,176,341 B1 | * | 1/2001 | Ansari | 180/402 |

\* cited by examiner

*Primary Examiner*—Anne Marie Boehler
(74) *Attorney, Agent, or Firm*—Carlson, Gaskey & Olds

(57) ABSTRACT

A method and system for independently controlling the steering of at least two wheels of a vehicle includes a steering angle sensor for sensing a desired amount of turning of the vehicle and a direction for the desired amount of turning. An electronic control unit, in communication with the steering angle sensor, determines a first desired turning angle for one of the wheels and a second desired turning angle for the other one of the wheels based on the desired amount of turning of the vehicle and the direction of the turning of the vehicle. The second desired turning angle may be the same as or different from the first desired turning angle. Independent turning mechanisms are coupled to each of the wheels and receives control signals from the electronic control unit for controlling the turning angles of each of the wheels independently of the other wheel.

14 Claims, 3 Drawing Sheets

METHOD AND SYSTEM FOR INDEPENDENTLY ELECTRONICALLY CONTROLLING STEERING OF VEHICLE WHEELS

BACKGROUND OF THE INVENTION

This invention relates to methods and systems for independently electronically controlling the steering of vehicle wheels.

Today's steering systems need improvements in several areas. For example, the front wheels of a vehicle are typically linked together mechanically so that each wheel turns at the same radius as the other wheel. One known disadvantage of this kind of system is the occurrence of tire scrub. That is, during turning of the vehicle the outer wheel rolls over the ground while the inner wheel rubs against the ground. Such action accelerates wear on the tires.

Another disadvantage of this kind of system is the occurrence of toe-in. Toe-in changes occur with time due to compliance and wear and results in the front wheels not being properly aligned with the rear wheels. That is, the front wheels are not both pointed straight ahead. This symptom can only be adjusted by taking the vehicle into a vehicle care center for manual adjustments.

Furthermore, steering systems employing hydraulic power assist also have a disadvantage. The hydraulic pump only needs to be activated when turning corners at slow speed, which is a relatively small proportion of the driving time. However, fuel is consumed continually to drive the hydraulic pump during power-on of the vehicle. Thus, a substantial amount of hydraulic loss occurs.

It is desirable to overcome the above listed disadvantages with a steering system that minimizes hydraulic loss, tire scrub, and toe-in to optimize tire life.

SUMMARY OF THE INVENTION

A method and system for independently controlling the steering of at least two wheels of a vehicle is achieved by sensing a desired amount and direction of turning of the vehicle via a steering angle sensor. An electronic control unit (ECU) determines a first desired turning angle for one of the wheels and a second desired turning angle for the other one of the wheels based on the desired amount and direction of turning of the vehicle. These turning angles may or may not be the same. The ECU then controls a turning mechanism associated with each of the wheels based on the first and second desired turning angles so that each wheel is turned independently of the other wheel.

A vehicle speed sensor attached to a transmission output shaft senses a speed of the vehicle for use in determining desired power assist to be applied to each of the wheels along with the desired amount of turning of the vehicle. Again, these torque inputs to the wheels may or may not be the same.

Furthermore, each of the wheels may include a valve stem attached thereto having a one-way check valve disposed therein for allowing air to flow into the wheel. A pressure sensor is also disposed in the valve stem for sensing a pressure in each of the wheels. If the pressure in either of the wheels is less than a desired amount of pressure, the ECU controls the one-way check valve to enable air flow from an air supply into either of the wheels.

Tire pressure, along with wheel speed, may be monitored as part of the alignment algorithm. Upon determining that the pressure between each of the wheels match and that the wheel speed between each of the wheels over a relatively short distance also match, an alignment is performed if the wheel speed starts to differ between each of the wheels over a longer distance. If an alignment is needed, the ECU controls the distance between each of the wheels via the corresponding turning mechanisms.

The turning mechanism may include a rack and pinion steering system having a rack and pinion as well as a motor, in which case the ECU controls the distance between the wheels by controlling a position of the rack relative to the pinion via the motor. Alternatively, in a worm-gear steering system having a lead screw, the ECU controls the distance between the wheels by controlling a position of the lead screw.

These and other features of the present invention can be understood from the following specification and drawings.

DETAILED DESCRIPTION OF A PREFERRED EMBODIMENT

Figure 1:
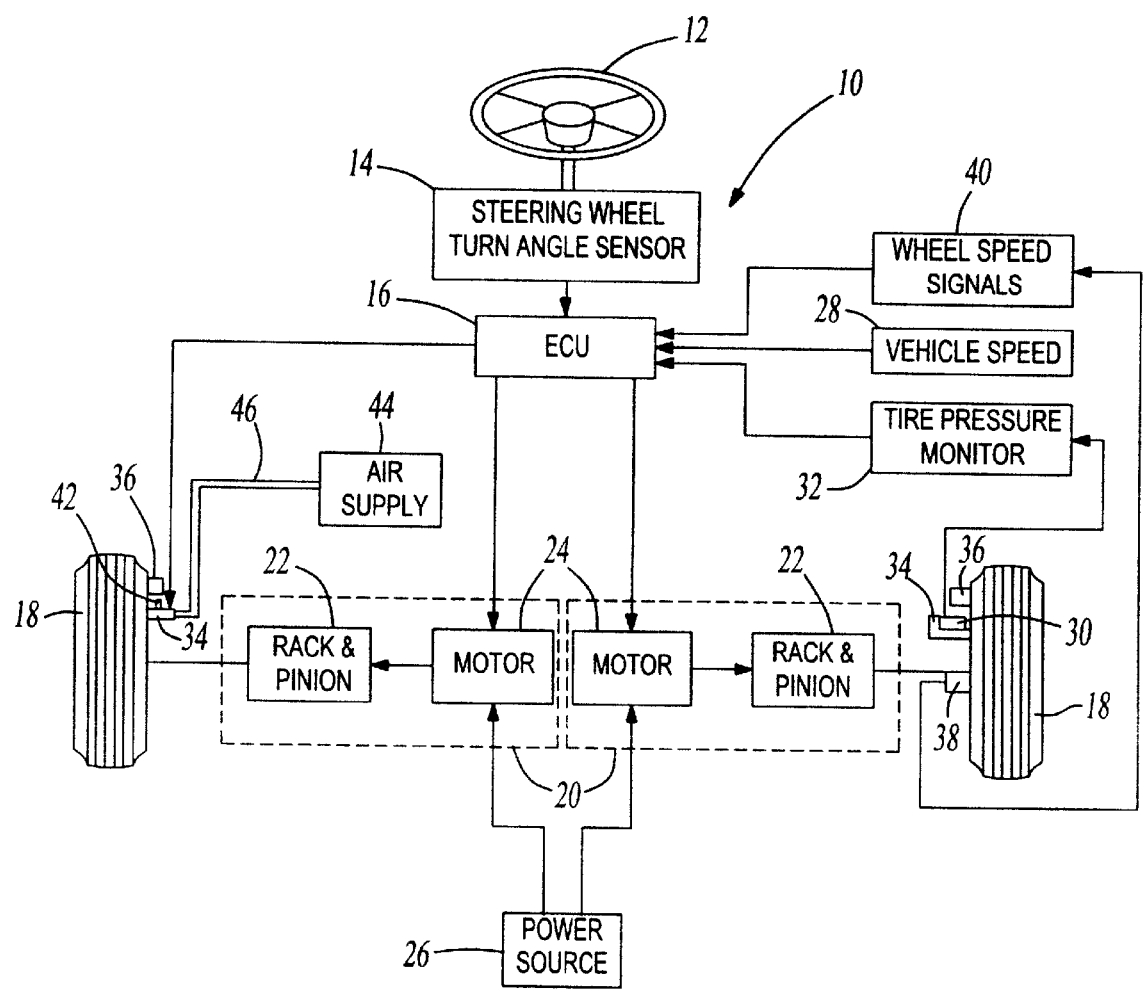
FIG. 1 is a schematic diagram of a vehicle incorporating the method and system of the present invention.

FIG. 1 shows a system 10 incorporating the present invention. The system 10 includes a steering wheel 12 and a steering angle sensor 14 associated with the steering wheel 12 for sensing the turning angle of the steering wheel 12. The steering angle sensor 14 is electronically coupled to electronic control unit (ECU) 16 having control logic programmed therein. The ECU 16 is responsible for controlling at least two steerable wheels 18 in response to the turning angle of the steering wheel 12, including an amount of turning and a direction of turning.

This independent steering of the wheels 18 is accomplished by coupling each of the wheels 18 to the ECU 16 via first and second turning mechanisms 20. The turning mechanisms 20 may be of a rack and pinion type including a rack and pinion component 22 and a motor 24 for driving the rack and pinion component 22. Each of the motors 24 may be powered by a common power source 26, such as the vehicle's battery. ECU 16 controls the direction of movement of each of the motors 24 independent of each other so that the wheels 18 can be optimally steered.

Alternatively, the turning mechanisms 20 may be of a worm-gear type having a lead screw (not shown) which would similarly be driven by the motors 24. Nevertheless, in either embodiment, each of the wheels 18 are turned at an angle, independently of the other wheel 18, based on the amount and direction of turning desired by the driver of the vehicle, as well as the known wheelbase of the vehicle. Thus, tire scrub is minimized since each of the wheels 18 are turned at optimum angles for the particular vehicle.

As a further enhancement, the present invention 10 allows for power steering to be enabled as needed. This is accomplished by sensing the speed of vehicle via a sensor (not shown) attached to the vehicle's transmission output shaft (not shown) and generating a corresponding vehicle speed signal 28 for receipt by ECU 16. Based on the steering angle and the vehicle speed, ECU 16 can then determine how much torque to apply to steer each of the wheels 18. At zero speed, high turning angle, the driver will need considerable torque added to the system 10 to make the turn easily. As the vehicle speed increases from zero, the torque required drops exponentially and at highway speeds, normal handling of curves, even to exit ramps, require very little additional torque. Thus, upon sensing the vehicle speed and the desired amount of turning, ECU 16 controls the amount of torque applied by each turning mechanism 20 to steer each of the wheels 18. Since power steering is provided only when needed, hydraulic losses associated with driving a hydraulic pump are eliminated.

The present invention also permits toe-in alignment to be corrected dynamically if needed, rather than requiring the vehicle to be taken in to a service center. Toe-in occurs when, in a straight position, the wheels 18 are at an angle to each other rather than being parallel. This condition can be determined based on the speed of the wheels over a predetermined time given that other factors are not present. That is, low tire pressure or mismatched tire sizes may indicate that there is a wheel misalignment. Therefore, the system 10 includes pressure sensors 30 in each of the wheels (only one of which is shown in FIG. 1) that generate respective pressure signals 32 for receipt by ECU 16. The pressure sensors 30 may be located in one of two valve stems 34 mounted on each of the wheels 18. The other valve stem 36 associated with each wheel 18 is used for inflating the wheel 18.

Furthermore, wheel speed sensors 38 (only one of which is shown in FIG. 1) are coupled to each wheel 18 for generating corresponding wheel speed signals 40 for receipt by ECU 16. Matched tire sizes is determined by measuring the rolling radius of each wheel 18 over a predetermined amount of time. This is accomplished by sensing the wheel speed, or by counting the number of pulses generated by wheel speed sensors 38, over the predetermined amount of time and comparing the counts of each sensor 38 to determine if they match. If the tire pressure and rolling radius of each of the wheels match, then the wheel speed is sensed over a second predetermined amount of time (i.e., a greater distance than that used for determining tire size matching), to determine if there is a difference in speed between each of the wheels 18.

If there is a difference in wheel speeds, the distance between each of the wheels 18 is altered to bring the wheels 18 into alignment. The displacement is controlled via the turning mechanisms 20. The relative wheel positions are adjusted by the turning mechanisms 20 to adjust for the toe-in. Without any knowledge as to which wheel 18, or if both wheels, needs to be adjusted, an iterative process is performed on one or both of the wheels 18 until the wheel speeds match. Alternatively, the alignment can be initially performed on one of the wheels 18 based on the vehicle speed signal 28. That is, any wheel 18 having a speed significantly different from the vehicle speed signal 28 is adjusted first until the wheel speed matches the vehicle speed.

As an added feature of the present invention, each of the valve stems 34 may include a one-way check valve 42, in addition to the pressure sensor 30, for allowing one-way air flow into the wheels 18. If the pressure of either of the wheels 18, as indicated by pressure signals 32, is less than a desirable pressure for the wheel(s) 18, ECU 16 may direct one-way check valve 42 to open so that air may flow into the wheel(s) 18 from an air supply 44 via a conduit 46 coupled to each of the one-way check valves 42. Thus, tire life is improved by maintaining optimum tire pressure.

Figure 2:
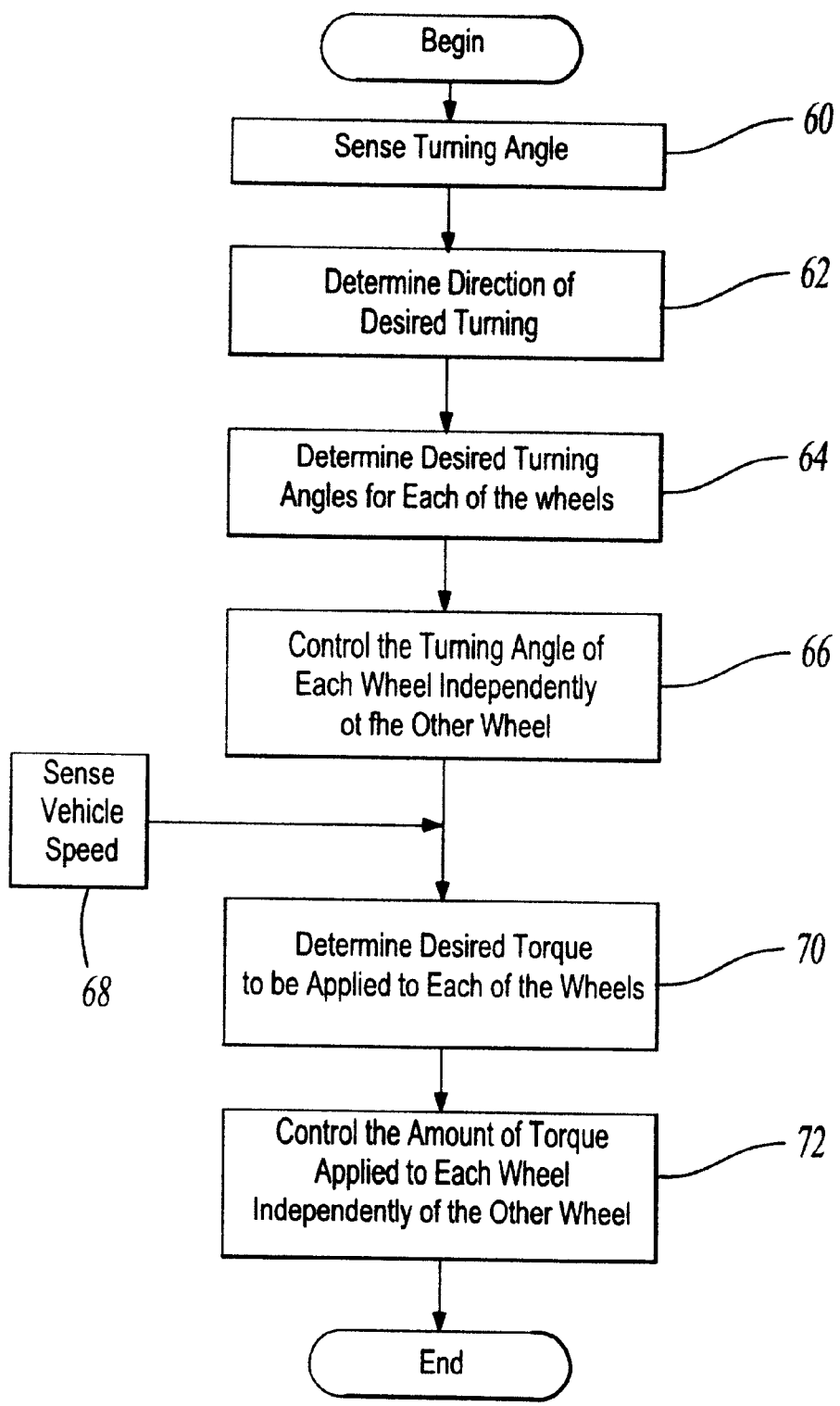
FIG. 2 is a flow diagram illustrating the general steps of the present invention.

Turning now to FIG. 2, a flow diagram illustrates the general steps associated with the present invention. At block 60, the desired turning angle is sensed from the steering wheel 12. The desired direction of turning, block 62, is also determined from the turning of the steering wheel 12. Based on this information, and the known wheelbase of the vehicle, a desired turning angle for each of the wheels 18 is determined, block 64. That is, two desired turning angles are determined, one for each of the wheels 18, which may or may not be the same. Based on these two turning angles, ECU 16 controls the turning of each of the wheels 18, as shown at block 66, via each of the wheels' respective turning mechanisms 20.

Upon sensing the speed of the vehicle, block 68, a desired amount of torque to be applied to each of the wheels is determined, as shown at block 70. Here again, as with the turning angles for each wheel 18, two separate torque inputs are determined, which may or may not be the same. ECU 16 then controls the amount of torque applied to each of the wheels 18, as shown at block 72, via each of the wheels' respective turning mechanisms 20.

Figure 3:
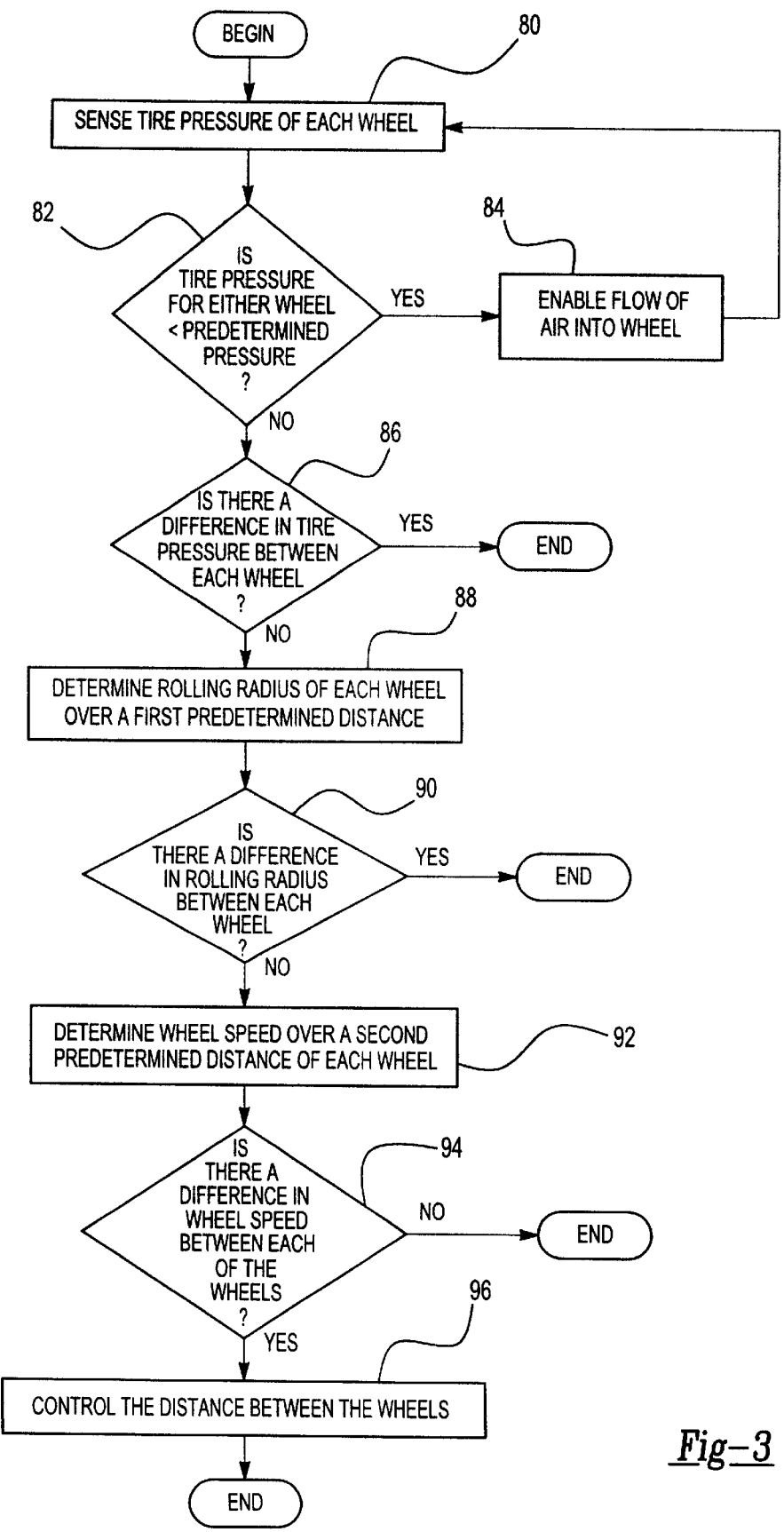
FIG. 3 is a flow diagram illustrating the general steps associated with an alternative embodiment of the present invention.

The steps associated with the added features of the present invention are shown in FIG. 3. The method begins with the step of sensing the tire pressure in each of the wheels 18, as shown at block 80. A determination is then made as to whether the pressure in either of the wheels 18 is less than a predetermined pressure threshold, as shown at conditional block 82. If either one of the wheels 18 has a pressure less than the predetermined pressure threshold, then ECU 16 controls one-way check valve 42 to enable air flow into the corresponding wheel 18, as shown at block 84.

If not, tire pressure is optimized and no air is allowed to flow into either of the wheels. The method then proceeds to determine if there is a difference in tire pressure between each of the wheels 18, as shown at conditional block 86. If so, the method ends and no further adjustments are made.

If the tire pressures match, the method proceeds to determine the rolling radius, i.e., tire size, of each of the wheels 18, as shown at block 88. This can be accomplished by sensing the wheel speed of each of the wheels 18, i.e., counting the number of pulses emitted by wheel speed sensors 38, over a short predetermined distance, e.g., 5 miles or less. Next, a determination is made as to whether or not there is a difference in the tire sizes between the two wheels 18, as shown at conditional block 90. If there is a difference, no further adjustments are made.

If there is no difference and the tire sizes match, however, toe-in adjustment may be made if the wheel speeds differ. Thus, the wheel speed of each of the wheels 18 is sensed over a second predetermined distance, e.g., 20 miles, as shown at block 92. Again, this can be accomplished by counting the number of pulses emitted by each of the wheel speed sensors 38. If there is a difference between the wheel speeds, conditional block 94, the distance between the wheels is adjusted, as shown at block 96. Otherwise, no alignment need be performed.

As discussed above, the adjustment to the distance between the wheels 18 may be performed on one or both of the wheels in an iterative manner or may be initiated based on the speed of the vehicle. That is, if the speed of one of the wheels 18 does not match the speed of the vehicle, that wheel 18 is moved relative to the other wheel 18 until its speed matches the speed of the vehicle and, thus, that of the other wheel 18.

Preferred embodiments have been disclosed. However, a worker skilled in this art would recognize that modifications would come within the scope of this invention. Thus, the following claims should be studied to determine the scope and content of this invention.

What is claimed is:

1. A method for independently controlling the steering of at least two wheels of a vehicle, the method comprising:
   sensing a desired amount of turning of the vehicle;
   determining a direction for the desired amount of turning;
   determining a first desired turning angle for one of the wheels and a second desired turning angle for the other one of the wheels based on the desired amount of turning of the vehicle and the direction of the turning of the vehicle, the second desired turning angle being one of the same as and different from the first desired turning angle;
   controlling each of the wheels based on the first and second desired turning angles;
   sensing a pressure in each of the wheels wherein each of the wheels include a valve stem attached thereto each having a one-way check valve disposed therein for allowing air to flow into the wheel; and
   controlling an amount of air flow into each of the wheels based on a comparison of the pressure in each of the wheels.

2. The method as recited in claim 1 further comprising:
   sensing a predetermined condition;
   sensing a speed of each of the wheels over a first predetermined distance upon sensing the predetermined condition; and
   controlling a distance between a portion of each of the wheels based on the speed of each of the wheels.

3. The method as recited in claim 2 wherein sensing the first predetermined condition comprises:
   sensing the pressure in each of the wheels;
   sensing a speed of each of the wheels over a second predetermined distance; and
   determining there is no difference in tire pressure and wheel speed between each of the wheels.

4. The method as recited in claim 2 wherein controlling the distance between each of the wheels includes comparing the speed of each wheel to determine if there is a difference in speed between each of the wheels.

5. The method as recited in claim 2 wherein the vehicle includes a rack and pinion steering system having a rack and pinion for controlling the turning of the wheels and wherein controlling the distance between the portions of the wheels includes controlling a position of the rack relative to the pinion.

6. The method as recited in claim 2 wherein the vehicle includes a worm-gear steering system having a lead screw for controlling the turning of the wheels and wherein controlling the distance between the wheels includes controlling a position of the lead screw.

7. The method as recited in 2 further comprising:
   sensing a speed of the vehicle; and
   wherein controlling the distance between the portions of the wheels includes controlling the distance between the wheels based on the speed of the vehicle and the speed of each of the wheels.

8. The method as recited in claim 1 wherein the vehicle includes a rotatable steering wheel for receiving input from a driver of the vehicle indicative of the amount and direction of turning of the vehicle desired by the driver and wherein sensing the desired amount of turning of the vehicle comprises sensing an angle of rotation of the steering wheel.

9. A system for independently controlling the steering of at least two wheels of a vehicle having a steering wheel for enabling a driver to turn the vehicle, the system comprising:
   a steering angle sensor for sensing a desired amount of turning of the vehicle;
   an electronic control unit coupled to the steering angle sensor;
   a first turning mechanism coupled to one of the wheels and the electronic control unit for turning the one of the wheels;
   a second turning mechanism coupled to the other one of the wheels and the electronic control unit for turning the other one of the wheels;
   wherein the electronic control unit is operative to determine a direction for the desired amount of turning, determine a first desired turning angle for one of the wheels and a second desired turning angle for the other one of the wheels based on the desired amount of turning of the vehicle and the direction of the turning of the vehicle, the second desired turning angle being one of the same as and different from the first desired turning angle, and control the first and second turning mechanisms based on the first and second desired turning angles, respectively, in order to independently control the turning of each of the wheels;
   a first and second valve stem attached to each of the wheels and each leaving a one-way check valve disposed therein for allowing air to flow into the wheels;
   a first and second pressure sensor disposed in each of the wheels for sensing a pressure in each of the wheels; and
   wherein the electronic control unit is further operative to control the first and second valve stems based on a comparison of the pressure sensed in each of the wheels in order to control the flow of air into each of the wheels.

10. The system as recited in claim 9 further comprising:
    a first and second wheel speed sensor for sensing a speed of each of the wheels and generating first and second wheel speed signals for receipt by the electronic control unit; and
    wherein the electronic control unit is further operative to sense a predetermined condition, receive the first and second wheel speed signals over a first predetermined amount of time upon sensing the predetermined condition, and control the first and second turning mechanisms based on the first and second speed signals received over the predetermined amount of time in order to control a distance between a portion of each of the wheels.

11. The system as recited in claim 10 wherein the electronic control unit, in sensing the predetermined condition, is further operative to determine a rolling radius of each of the wheels based on the speed of each of the wheels over a second predetermined distance, determine if the pressures between each of the wheels is the same and determine if the rolling radius of each of the wheels is the same.

12. The system as recited in claim 10 wherein the first and second turning mechanisms are rack and pinion steering systems each having a rack and pinion for controlling the turning of the wheels and wherein the electronic control unit, in controlling the distance between the wheels, is further operative to control a position of the rack relative to the pinion.

13. The system as recited in claim 10 wherein the first and second turning mechanisms are worm-gear steering systems each having a lead screw for controlling the turning of the wheels and wherein the electronic control unit, in controlling the distance between the wheels, is further operative to control a position of the lead screw.

14. The system as recited in 10 further comprising:

a vehicle speed sensor for sensing a speed of the vehicle; and wherein the electronic control unit, in controlling the distance between the wheels, is further operative to control the distance between the portions of the wheels based on the speed of the vehicle and the speed of each of the wheels.

* * * * *

UNITED STATES PATENT AND TRADEMARK OFFICE
CERTIFICATE OF CORRECTION

PATENT NO.   : 6,554,094 B1
DATED        : April 29, 2003
INVENTOR(S)  : Bell et al.

It is certified that error appears in the above-identified patent and that said Letters Patent is hereby corrected as shown below:

Column 6,
Line 28, "leaving" should be -- having --.

Signed and Sealed this

Eighth Day of July, 2003

JAMES E. ROGAN
*Director of the United States Patent and Trademark Office*